July 22, 1924.
A. A. WILSON
1,501,933
DEVICE FOR AUTOMATICALLY CONTROLLING THE TEMPERATURE OF COOLING SYSTEMS
OF INTERNAL COMBUSTION ENGINES
Original Filed Dec. 31, 1921    3 Sheets—Sheet 1
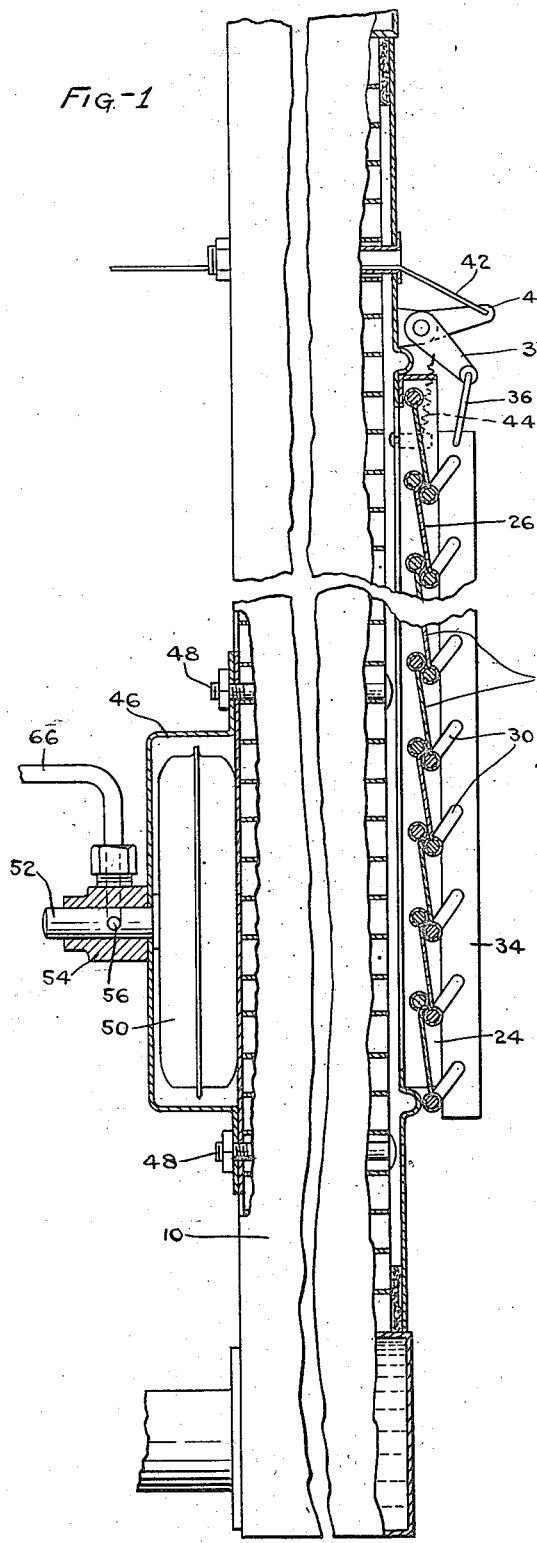
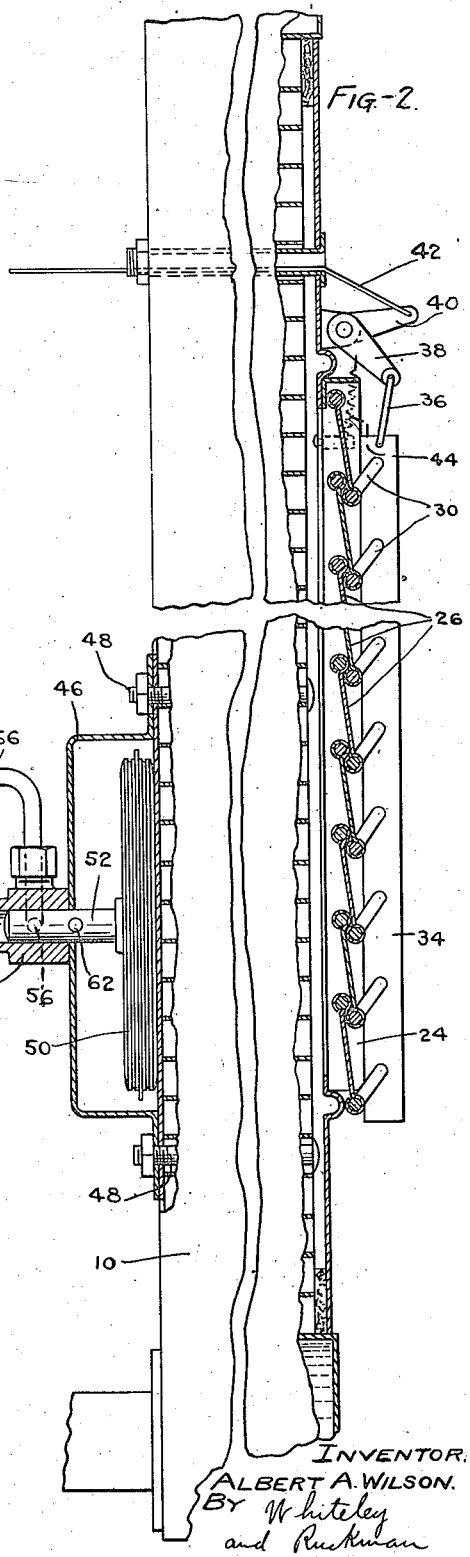
INVENTOR.
ALBERT A. WILSON.
BY Whiteley
and Ruckman
ATTORNEYS.

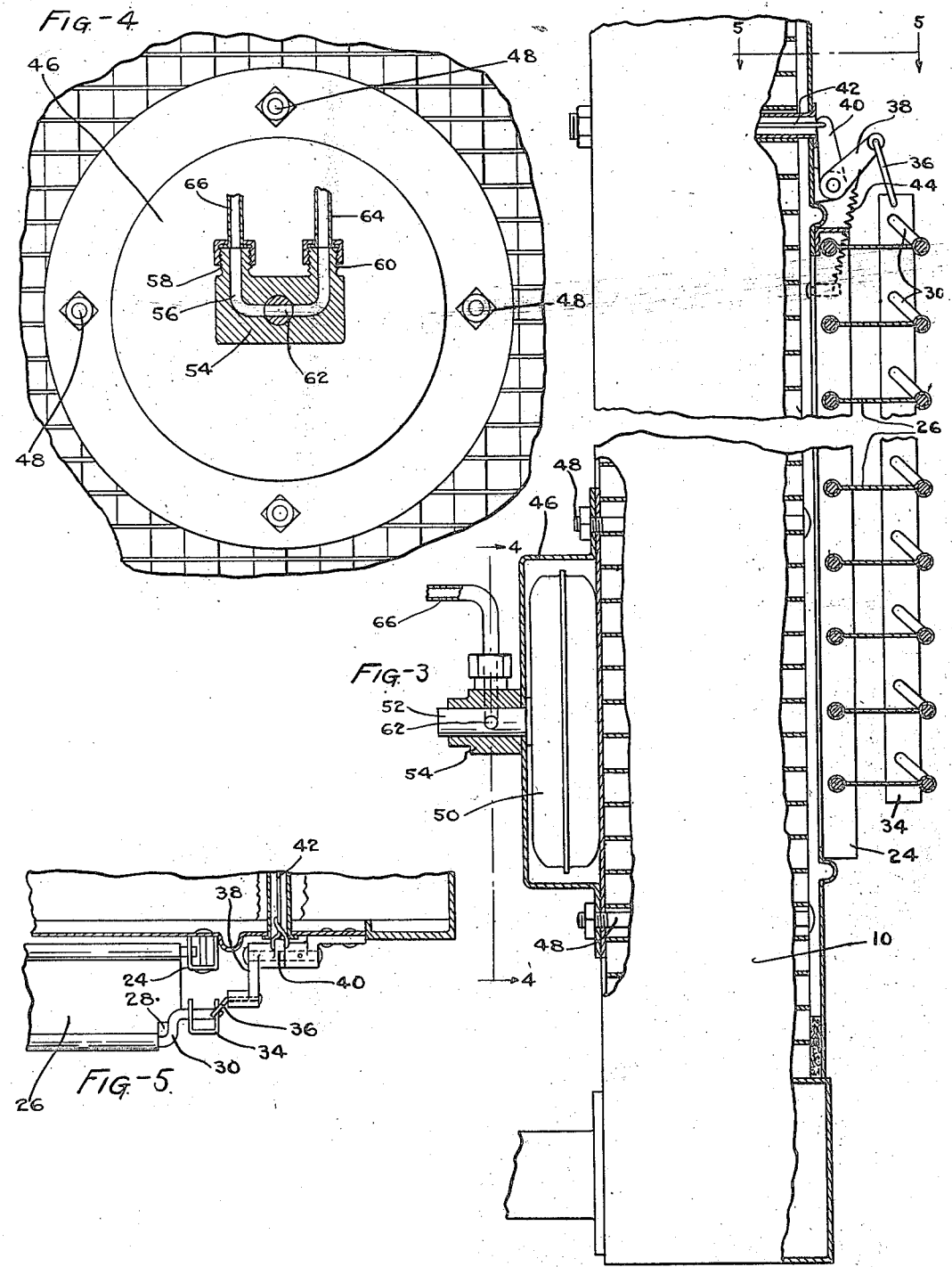

July 22, 1924.  1,501,933
A. A. WILSON
DEVICE FOR AUTOMATICALLY CONTROLLING THE TEMPERATURE OF COOLING SYSTEMS
OF INTERNAL COMBUSTION ENGINES
Original Filed Dec. 31, 1921   3 Sheets-Sheet 3
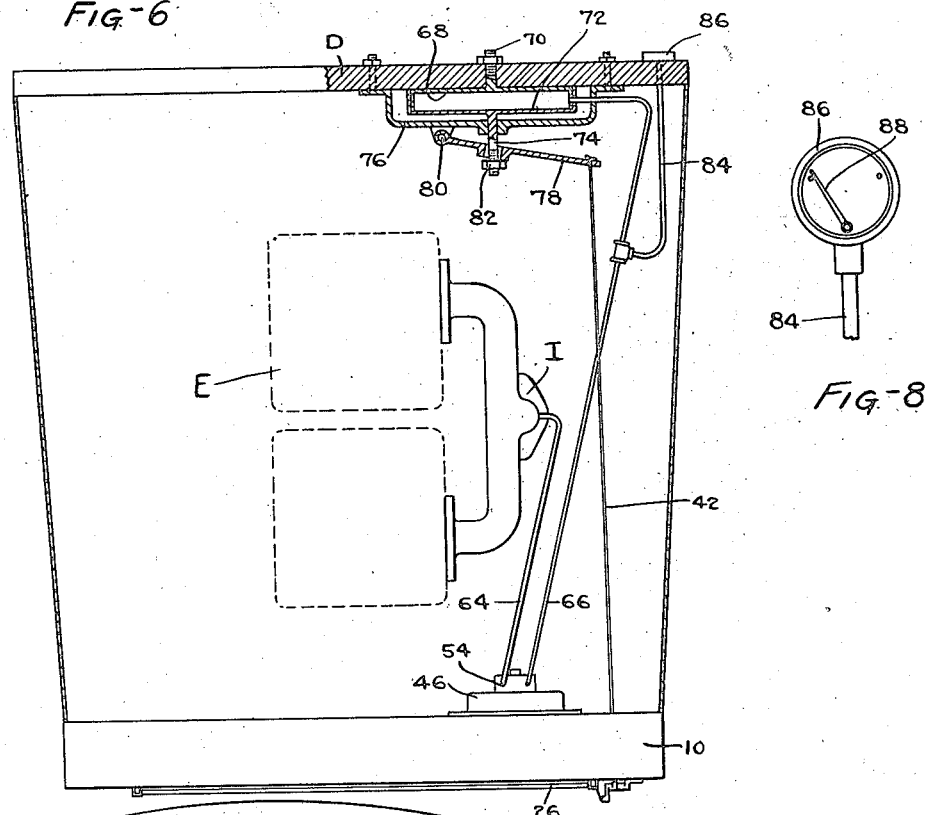
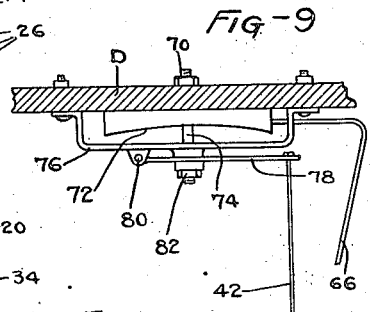
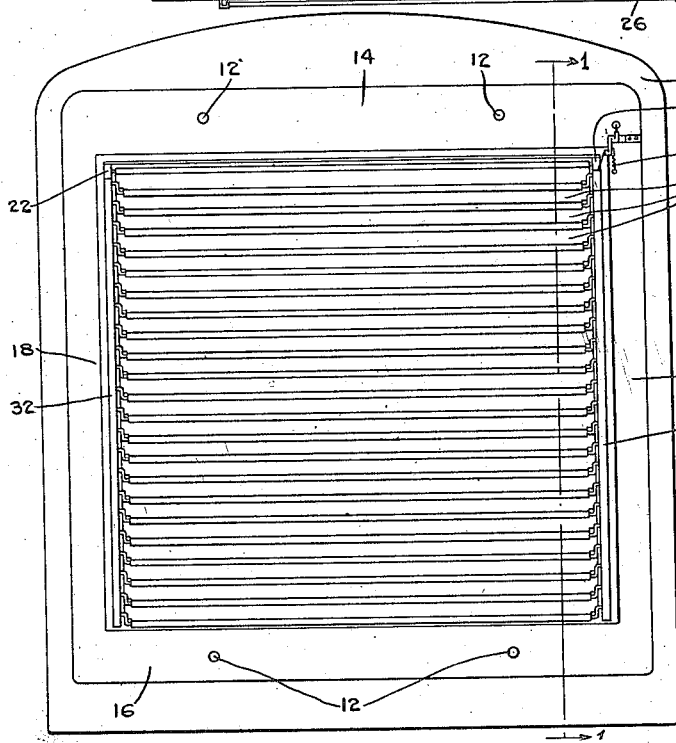
INVENTOR:
ALBERT A. WILSON
BY Whiteley and Ruckman
ATTORNEYS.

Patented July 22, 1924.

1,501,933

UNITED STATES PATENT OFFICE.

ALBERT A. WILSON, OF MINNEAPOLIS, MINNESOTA.

DEVICE FOR AUTOMATICALLY CONTROLLING THE TEMPERATURE OF COOLING SYSTEMS OF INTERNAL-COMBUSTION ENGINES.

REISSUED

Application filed December 31, 1921, Serial No. 526,364. Renewed May 26, 1924.

*To all whom it may concern:*

Be it known that I, ALBERT A. WILSON, a citizen of the United States, residing at Minneapolis, in the county of Hennepin and State of Minnesota, have invented certain new and useful Improvements in Devices for Automatically Controlling the Temperature of Cooling Systems of Internal-Combustion Engines, of which the following is a specification.

My invention relates to devices for automatically controlling the temperature of cooling systems of internal combustion engines. An object is to provide a device of this character which will prevent the passage of cooling air through the radiator of the engine until the circulating water becomes heated to such a degree as to make cooling thereof desirable, and which will then permit the passage of cooling air. Another object is to provide a device of this character including shutters for the front of the radiator which shutters will normally be held in closed position and will be opened only by the suction produced by the engine in case the latter is running and the temperature of the water has reached the point where cooling is desirable. Another object is to provide an indicator upon observation of which the driver can readily tell whether the shutters are opened or closed.

The full objects and advantages of my invention will appear in connection with the detailed description, and the novel features embodied in my inventive idea will be particularly pointed out in the claims.

In the accompanying drawings which illustrate one of the forms in which my invention may be embodied, Fig. 1 is a sectional elevational view of my device, the section being on the line 1—1 of Fig. 7 and the parts being in the position which they occupy when the cooling system is heated but with the engine not running. Fig. 2 is a similar view which, however, shows the parts in the position which they occupy when the cooling system is cooled and regardless of whether or not the engine is running. Fig. 3 is a similar view but showing the parts in the position which they occupy when the cooling system is hot and the engine is running. Fig. 4 is a view in vertical section on the line 4—4 of Fig. 3. Fig. 5 is a view in horizontal section on the line 5—5 of Fig. 3. Fig. 6 is a top plan view partly in section. Fig. 7 is a front elevational view looking at the front of the radiator. Fig. 8 is an elevational view of a gauge. Fig. 9 is a detail view showing a diaphragm in collapsed condition.

Referring to the construction shown in the drawings, the numeral 10 designates any customary or suitable radiator casing to the front of which a frame member is secured by bolts 12. This frame member is best shown in Fig. 7 and consists of a top portion 14, a bottom portion 16 and opposite side portions 18 and 20. The inner margins of the side portions 18 and 20 are provided with outstanding flanges 22 and 24. The rear edges of a plurality of shutters 26 are pivotally attached to the flanges 22 and 24. The corners of the forward edges of the shutters are cut away as shown at 28 in Fig. 5 to accommodate cranks 30 attached to these forward edges. The outer ends of these cranks are pivotally attached to vertical angle bars 32 and 34 so that the ends of the shutters are connected at both sides for simultaneous movement from closed to open position and vice versa. A link 36 connects the upper end of the bar 34 to the lower arm 38 of a bell crank lever which is pivoted to the radiator casing. Secured to the upper arm 40 of the bell crank lever is a wire 42 which extends rearwardly through the radiator and is adapted to be operated in a manner soon to be described. A spring 44 secured to the arm 38 and to a projection on the frame member 20 normally holds the shutters in downward position so that they are closed. A casing 46 is secured by bolts 48 to the rear of the radiator. This casing contains a disk thermostat 50 having a post 52 projecting through the rear wall of this casing and through a cylindrical opening in a block 54. This block contains a U-shaped passageway 56 extending between screw threaded nipples 58 and 60 on the rear of the block. The passageway 56 cuts through the opening which contains the post 52 and this post has an opening 62 which when the thermostat is expanded causes the two branches of the U-shaped passageway 56 to be placed in communication with each other as shown in Figs. 1, 3 and 4.

When the thermostat is in contracted condition, the post 52 is retracted and the opening 62 will not register with the branches of the U-shaped passageway whereby communication through the latter is blocked. The nipple 60 is connected by a pipe 64 with the intake manifold I of the internal combustion engine E whereby suction is produced in this pipe when the engine is running. The nipple 58 is connected by a pipe 66 with the interior of a casing 68 which is secured by a bolt 70 to some fixed part of the vehicle such as the dash D. The front wall 72 of the casing 68 constitutes a diaphragm which is drawn inwardly as shown in Fig. 9 when subjected to the suction of the engine. Attached to the diaphragm 72 is a forwardly extending post 74 which passes slidably through a support 76. The outer portion of this post extends loosely through an opening in a lever 78 which is pivoted at 80 to the support 76. The outer end of the post 74 is threaded and provided with a nut 82 whereby collapsing of the diaphragm causes the post to pull the lever 78 rearwardly. The wire 42 previously mentioned is attached to the free arm of the lever 78. A pipe 84 branching from the pipe 66 is connected to a gauge 86 secured to the rear of the dash D. A pointer 88 associated with the gauge occupies either a right hand or a left hand position according to whether or not the casing 68 is subjected to vacuum and as will be apparent indicates whether the shutters are open or closed.

The operation and advantages of my invention will be apparent in connection with the foregoing description. The shutters at the front of the radiator will be moved into open position as shown in Fig. 3 only when the engine is running, and at the same time the water in the cooling system is heated to a degree sufficient to require cooling. The shutters will always be closed when the engine is not running since they are opened by the suction produced by the engine. This suction becomes effective for the purpose of opening the shutters only when the water becomes sufficiently heated to make cooling desirable. By reference to Fig. 1, it will be seen that when the temperature of the water reaches this point, the expansion of the thermostat brings the opening 62 into register with the passageway 56. This obviously has no effect on the shutters if the engine is not running. However, if the engine is running, the suction produced thereby causes the diaphragm 72 to be drawn into the position shown in Fig. 9, thereby pulling upon the wire 42 and bringing the shutters into open position as shown in Fig. 3. It is particularly desirable that the shutters should close in cold weather as soon as the engine is stopped, since this aids in maintaining the heat of the engine, thereby reducing the likelihood of undesirable cooling of the same and making it easier to start. When the engine is running and the shutters are opened, a decrease in temperature of the cooling system down to a desirable minimum is immediately followed by the closing of the shutters. When the water again heats up to a desirable maximum, the shutters again open. This operation is entirely automatic and the driver can at all times be aware of whether the shutters are opened or closed by observing the position of the pointer 88.

I claim:

1. A device for automatically controlling the temperature of cooling systems of internal combustion engines of motor vehicles comprising a casing secured to the dash of the motor vehicle, one of the walls of said casing constituting a diaphragm, a closure device mounted in front of the radiator, connections between said diaphragm and said closure device whereby inward movement of said diaphragm will open said closure device, a pipe connection between the chamber of said casing and the intake of the engine, a thermostat secured to the back of the radiator, and a movable member operated by said thermostat, said member normally closing the passageway through said pipe connection and causing said passageway to be opened when said thermostat expands a predetermined amount.

2. A device for automatically controlling the temperature of cooling systems of internal combustion engines comprising a closure device for preventing passage of air through the radiator, means whereby suction of the engine when running will open said closure device, means for preventing operation of said last mentioned means until the cooling system has become heated to a predetermined degree, and an indicator adapted to be mounted in view of the driver and operated by the suction for indicating whether said closure device is open or closed.

In testimony whereof I hereunto affix my signature.

ALBERT A. WILSON.